United States Patent [19]
Franciskovich et al.

[11] Patent Number: 5,833,419
[45] Date of Patent: *Nov. 10, 1998

[54] ANGULARLY ACCESSIBLE HEAD FOR THREADED CONNECTOR

[76] Inventors: Mark Franciskovich, 2434 Park Ave., North Riverside, Ill. 60546; Steve August Masnjak, 41 W. 861 High Point La., Elburn, Ill. 60119

[ * ] Notice: The term of this patent shall not extend beyond the expiration date of Pat. No. 5,606,898.

[21] Appl. No.: 720,920

[22] Filed: Oct. 7, 1996

Related U.S. Application Data

[63] Continuation-in-part of Ser. No. 447,616, May 23, 1995, Pat. No. 5,666,898.

[51] Int. Cl.⁶ .................................................... F16B 23/00

[52] U.S. Cl. ........................... 411/403; 411/405; 411/380; 411/919

[58] Field of Search ..................... 411/380, 403, 411/405, 919; 248/288.31, 292.14

[56] References Cited

U.S. PATENT DOCUMENTS

| | | | |
|---|---|---|---|
| 172,351 | 1/1876 | Sloan | 411/403 |
| 662,134 | 11/1900 | Rodd | 411/405 |
| 1,997,422 | 4/1935 | Lorenzen et al. | 411/403 |
| 2,180,633 | 11/1939 | Holt | 411/403 |
| 2,750,974 | 6/1956 | Hart | 81/436 |
| 3,213,719 | 10/1965 | Kloack | 411/403 |
| 3,236,141 | 2/1966 | Smith | 411/405 |
| 3,957,241 | 5/1976 | Morris et al. | 248/288.31 |
| 4,128,038 | 12/1978 | Urwin | 411/403 |
| 4,311,071 | 1/1982 | Bassell | 411/404 |
| 4,492,488 | 1/1985 | Warshawsky | 248/288.31 |
| 5,404,682 | 4/1995 | West | 248/288.31 |
| 5,606,898 | 3/1997 | Franciskovich et al. | 411/405 |

Primary Examiner—Kenneth J. Dorner
Assistant Examiner—Fredrick Conley
Attorney, Agent, or Firm—Kajane McManus

[57] ABSTRACT

The angularly accessible head for a threaded connector comprises a spherical structure having a centered slot therein, the slot having a bottom surface or wall in the shape of an inverted V, with a center point thereof extending toward and terminating below the center of the sphere. The head is functionally accessible from a plurality of planes which are not coplanar with a center plane of the slot.

5 Claims, 1 Drawing Sheet

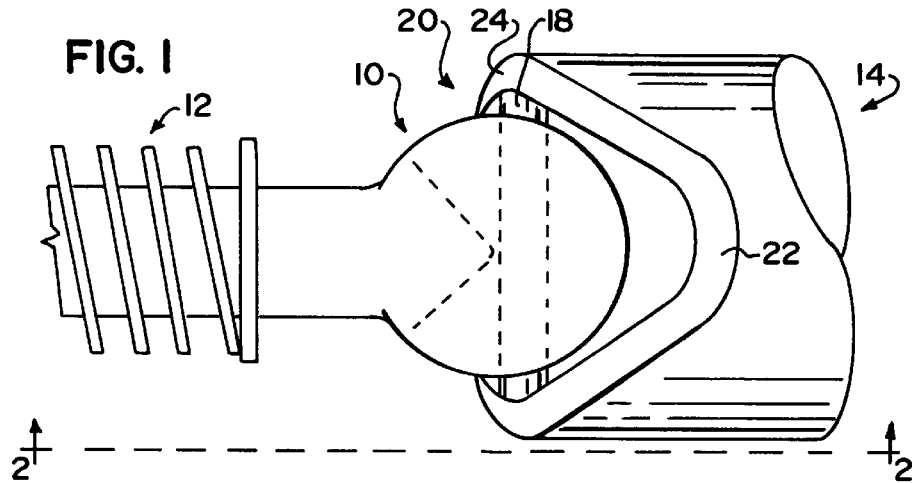
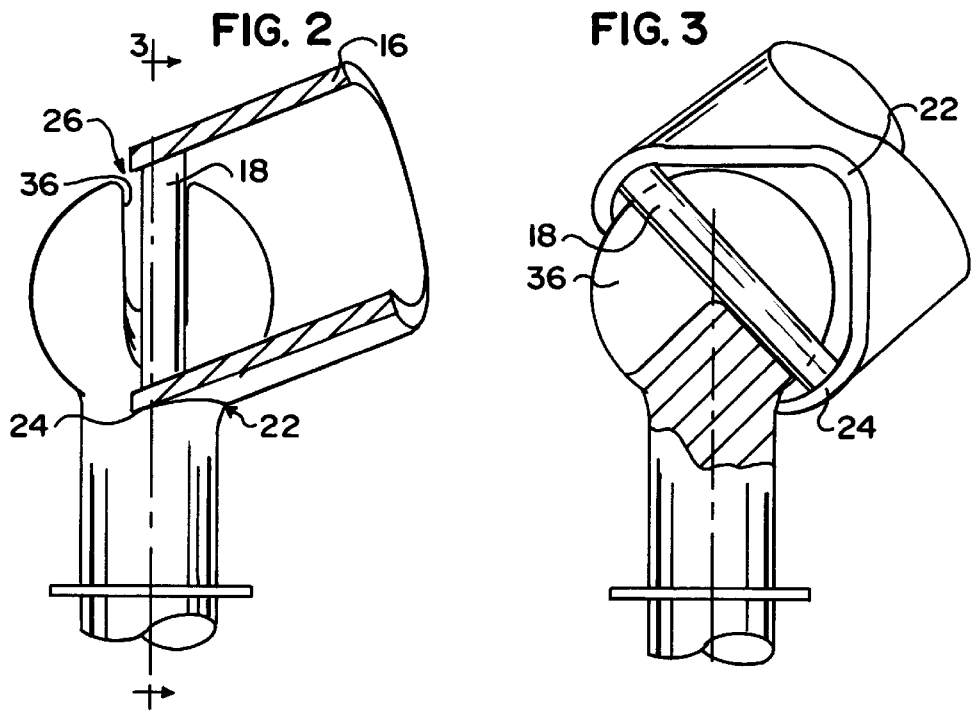
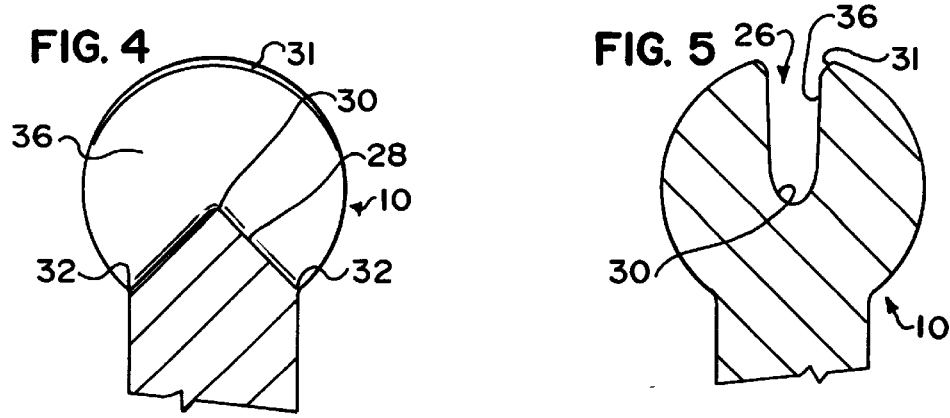

ANGULARLY ACCESSIBLE HEAD FOR THREADED CONNECTOR

CROSS REFERENCE TO RELATED APPLICATIONS

This application is a continuation-in-part of U.S. application Ser. No. 447,616 filed May 23, 1995, now U.S. Pat. No. 5,666,898, and entitled Angularly Accessible Head for Threaded Connector and Cooperating Tool.

BACKGROUND OF THE INVENTION

The present invention relates to an angularly accessible head for a threaded connector such as a screw or bolt.

PRIOR ART

Heretofore, threaded connectors have required placement in such a manner that a tool for use in manipulating same may lie in the same plane as the connector or at the very least in the plane of the connector head slot.

For instance, a screwdriver must be coplanar with the slot for same in the screw head to operate efficiently in manipulating the screw. Likewise, a socket for use in tightening a bolt must be coplanar to engage the polygonal circumference of the bolt for manipulation.

Such required alignment can cause problems, such as when a tool cannot be aligned appropriately due to lack of space. This is a particular problem in vehicles, such as when one wishes to remove a hose clamp but cannot access the screw head, often requiring the clamp to be mangled or cut for removal.

SUMMARY OF THE INVENTION

Accordingly, it is a primary object of the invention to provide a connector head which is accessible at an angle thereto for manipulation.

BRIEF DESCRIPTION OF THE DRAWINGS

FIG. 1 is a side view of the connector head of the present invention engaged to a tool for manipulating the head.

FIG. 2 shows a side view of the connector head looking into a slot thereof, showing a rod of the tool lying across a near vertical diameter of the head, relative to a vertical axis of the connector, and shows the tool itself positioned at a most non-axially aligned position thereof as allowed by the configuration of the connector head.

FIG. 3 is a view similar to FIG. 2, with the connector head shown in cross section, and is taken along line 3—3 of FIG. 1.

FIG. 4 is a cross section through the connector head and is taken along line 4—4 of FIG. 1.

FIG. 5 is a cross section through the connector head in a plane transverse to that of FIG. 4.

DESCRIPTION OF THE PREFERRED EMBODIMENT

Referring now to the drawings in greater detail, there is illustrated in FIG. 1 a connector head 10 made in accordance with the teachings of the present invention. The head 10 is proposed for use on any threaded connector 12 which requires a rotational manipulation for activation.

There is also illustrated in FIG. 1 a head portion 14 of one tool 15 proposed for use in manipulating the connector head 10. Only the head portion 14 of a tool is disclosed because the head portion 14 may be created as a socket or may be integrally formed with a handle extending therefrom.

Turning now to FIGS. 2 and 3, it will be seen that the head portion of the tool is in the form of a hollow cylinder 16 having a circular in cross section cross member, rod or bar 18 extending centrally across an open end 20 of the head portion 14. The open end 20 has a configuration which includes two sloping or cusp areas 22 juxtaposed to two plateau like areas 24, the rod 18 extending between the opposite plateau like areas 24, and being slightly inset therefrom.

It will be seen from FIG. 1, that the cusp areas 22 mimic the shape of the connector head 10 when the bar 18 of the tool head portion 14 is engaged within a slot 26 provided in the connector head 10. Such mimicry allows for relative pivotability between the connector head 10 and the tool head portion 14, as will be defined in greater detail hereinafter.

It will be understood that, although a preferred embodiment of a tool head portion 14 is illustrated, any tool having a rod like member suspended from its ends by supporting, manipulatable structure which would allow for relative pivotable engagement between the rod and connector slot would be functional.

Turning now to FIGS. 4 and 5, there is shown therein the spherical connector head 10 in cross section, both across and through the slot 26. As illustrated, the head 10 includes the slot 26 which is centered within and extends completely across the spherical head 10 and has an inverted V shaped base or bottom wall 28, with a tip or point 30 of the wall 28 being approximately centered across the circular cross section of the head 10 and rising to a position below a vertical center of a vertical diameter of the circular cross section.

The external edges 31 of the slot 26 are chamfered, as is each external edge 32 of the bottom wall 28 of the slot 26. Chamfering of the edges provides for smoothly flowing motion of a tool about the connector head 10.

The desirability and functional advantage of the configuration proposed for the connector head 10 can best be described through a study of the most extreme relative functional positions for the connector head 10 and the tool head portion 14 afforded by the connector head 10, as best shown in FIGS. 2 and 3.

In this respect, it first will be understood that presently available connection heads require planar alignment between a slot the connector head and a center axis of a driver for the connector. A driver may pivot from side to side relative to and within a center plane of the slot but cannot be functionally engaged to and within the slot if not coplanar therewith. Secondly, because a slot is typically formed in a semi-spherical connector head, when a driver is not axially aligned with the connector, having been pivoted to one side or the other in the slot, only one half of a radius of the slot is acted upon by one half a width of an engaged driver tip. More work is required to cause rotation of the driver tip and engaged connector and the driver, due to such-partial non-secure engagement, easily slips along and out of engagement within the slot.

FIGS. 2 and 3 illustrate first that the ramped configuration of the bottom wall 28 of the slot 26 acts as an abutment against which rod 18 is forced, keeping the engagement therebetween secure against slippage. Secure engagement is further assured by abutting engagement created between cusp 22 of the tool head portion 14 and a periphery of the spherical connector head 10.

Secondly, because of the circular cross section of the connector head 10, an entire length of the bar 18, rather than only half thereof, engages an entire diameter, rather than a radius of, walls 36 of the slot 26. Such diametric engagement is assured by positioning ramp tip 30 below center. Mathematically, force required for causing rotation of the connector 12 should be reduced by more than half, it being understood that activation of the connector 12 is accomplished by an abutment created between the rod 18 and either side wall surface 36 defining the slot 26, in similar manner that screw activation is accomplished with a screw driver.

Further, as best shown in FIG. 2, the connector head 10 allows a driver access from any of a plurality of radii which are not coplanar with a center plane of the slot 26. Thus the connector head 10 is not only accessible from a plurality of radii lying in a center plane of the slot 26 but is also concurrently accessible from a plurality of non-coplanar radii, such combineable accessibilities allowing for angulation of approximately 45 degrees from the axis of the connector 12 and for the surface 28 and allowing for angulation of up to approximately 90 degrees for rod 18 relative to the axis of the connector 12.

As described above, the connector head 10 provides a number of advantages, some of which have been described above and others of which are inherent in the invention. Also, modifications may be proposed without departing from the teachings herein. Accordingly the scope of the invention is only to be limited as necessitated by the accompanying claims.

We claim:

1. An angularly accessible head for a threaded connector, which is functionally accessible by a cooperating tool from a plurality of radial planes both coplanar and noncoplanar with a plane of a slot thereof, the head comprising a substantially spherical member having a centered slot extending thereacross, the substantially spherical member having a substantially circular cross section and the slot extending substantially past a center of the head and having a bottom wall in the form of an inverted V, a point of the V being directed toward the center of the spherical member , and the slot having flat side walls with a generally circular outside perimeter.

2. The head of claim 1 wherein said bottom of said slot is defined by two laterally diverging slopes.

3. The head of claim 2 wherein the slopes define an angle of approximately 90 degrees therebetween.

4. The head of claim 3 wherein the point of the inverted V bottom wall extends upwardly into said slot to a point below the center point of the spherical member.

5. The head of claim 4 wherein the slot is defined by edges which are chamfered.

\* \* \* \* \*